US012659099B2

(12) United States Patent (10) Patent No.: US 12,659,099 B2

Patchava et al. (45) Date of Patent: Jun. 16, 2026

(54) ENVELOPE TRACKING USING DUAL TONES

(71) Applicant: QUALCOMM Incorporated, San Diego, CA (US)

(72) Inventors: Raviteja Patchava, San Diego, CA (US); Piyush Gupta, Bridgewater, NJ (US); Zhifei Fan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 18/314,399

(22) Filed: May 9, 2023

(65) Prior Publication Data

US 2024/0380536 A1 Nov. 14, 2024

(51) Int. Cl.
*H04W 72/1273* (2023.01)
*H04L 5/00* (2006.01)
*H04W 72/0453* (2023.01)

(52) U.S. Cl.
CPC ....... *H04L 5/0048* (2013.01); *H04W 72/0453* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 6,522,637 B1 | 2/2003 | Mimura et al. | |
| 2004/0087313 A1* | 5/2004 | Reid ...................... | H04L 27/22 |
| | | | 455/119 |

| | | | |
|---|---|---|---|
| 2006/0226897 A1* | 10/2006 | De Ruijter ............... | H03D 3/26 |
| | | | 329/315 |
| 2018/0041204 A1* | 2/2018 | Zhu ................... | H03K 17/08122 |
| 2019/0260545 A1* | 8/2019 | Wang .................... | H04W 72/23 |
| 2021/0076449 A1* | 3/2021 | Tirucherai Muralidharan ........... | |
| | | | H04W 52/0245 |
| 2022/0078068 A1 | 3/2022 | Wilhelmsson et al. | |
| 2022/0326380 A1* | 10/2022 | Noguchi ................. | G01S 17/10 |
| 2023/0111392 A1* | 4/2023 | Noguchi ............... | G01S 13/584 |
| | | | 342/109 |
| 2023/0344677 A1* | 10/2023 | Ye ........................ | H04L 25/0204 |
| 2024/0032029 A1* | 1/2024 | Zhang ................... | H04L 5/0012 |

FOREIGN PATENT DOCUMENTS

| | | | | |
|---|---|---|---|---|
| WO | WO-2023000173 A1 | | 1/2023 | |
| WO | WO-2023134510 A1 * | 7/2023 | ........ | H04W 72/0453 |
| WO | WO-2024229605 A1 * | 11/2024 | ............. | H02J 50/20 |

OTHER PUBLICATIONS

International Search Report and Written Opinion—PCT/US2024/023561—ISA/EPO—Jul. 15, 2024 (2303136WO).

* cited by examiner

*Primary Examiner* — The Hy Nguyen

(74) *Attorney, Agent, or Firm* — Holland & Hart LLP/Qualcomm

(57) ABSTRACT

Methods, systems, and devices for wireless communications are described. A user equipment (UE) may receive an indication of a delta-frequency associated with a dual-tone downlink transmission from a network entity, the delta-frequency defining a frequency difference between two tones used for the dual-tone downlink transmission. The UE may receive the dual-tone downlink transmission from the network entity according to the two tones. The UE may decode the dual-tone downlink transmission based at least in part on the delta-frequency.

30 Claims, 17 Drawing Sheets

910

920

915

905

900

130

105

115

Network
Entity

Transceiver

1210

Antenna

1215

Communications
Manager

1220

Memory

Code

1230

1225

1240

Processor

1235

1205

1200

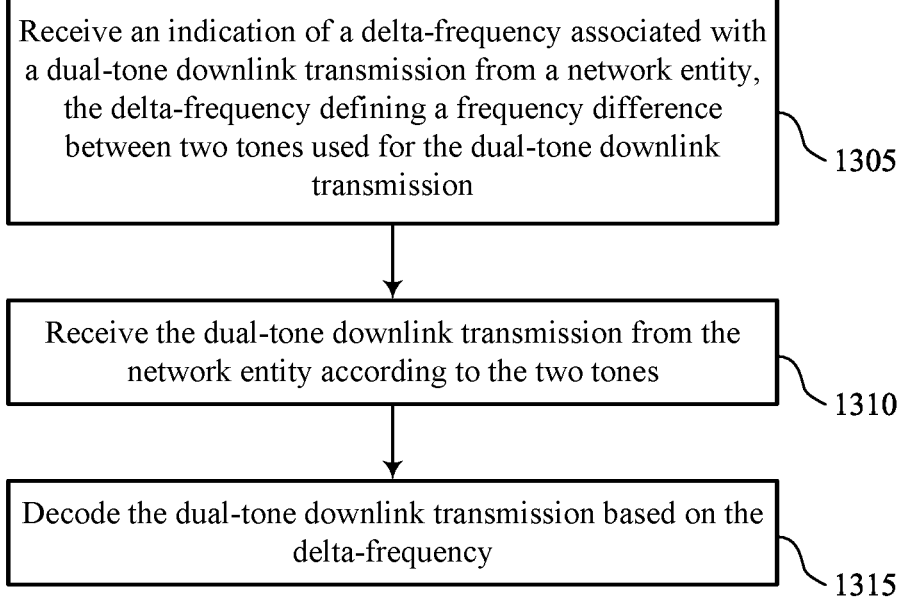

Receive an indication of a delta-frequency associated with a dual-tone downlink transmission from a network entity, the delta-frequency defining a frequency difference between two tones used for the dual-tone downlink transmission

1305

Receive the dual-tone downlink transmission from the network entity according to the two tones

1310

Decode the dual-tone downlink transmission based on the delta-frequency

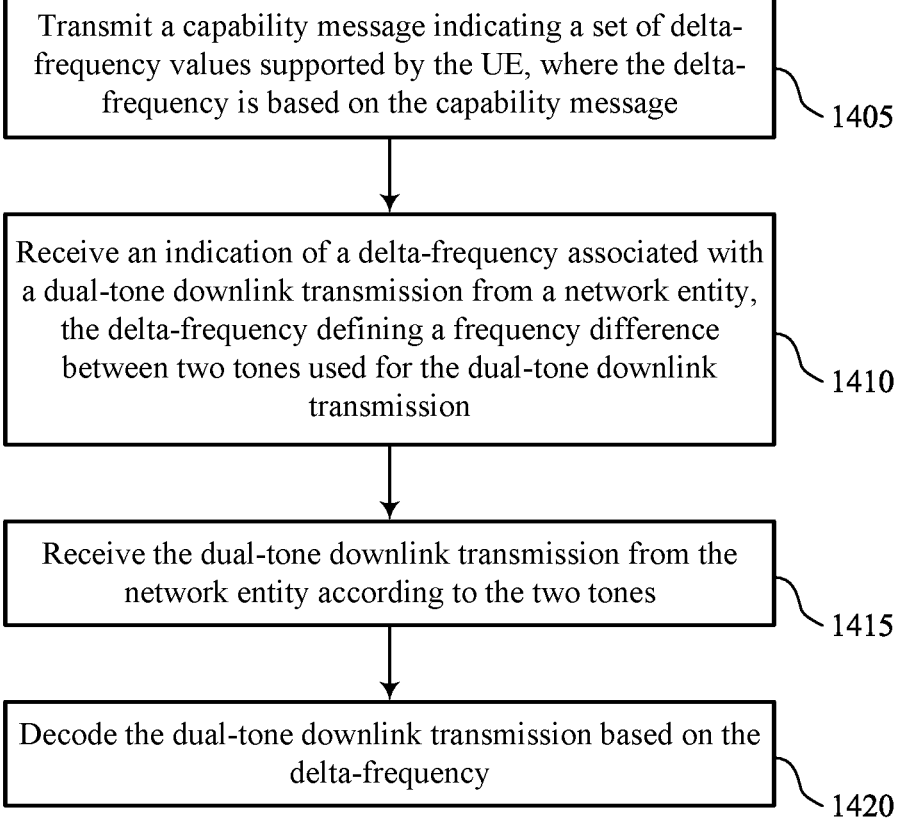

Transmit a capability message indicating a set of delta-frequency values supported by the UE, where the delta-frequency is based on the capability message

1405

Receive an indication of a delta-frequency associated with a dual-tone downlink transmission from a network entity, the delta-frequency defining a frequency difference between two tones used for the dual-tone downlink transmission

1410

Receive the dual-tone downlink transmission from the network entity according to the two tones

1415

Decode the dual-tone downlink transmission based on the delta-frequency

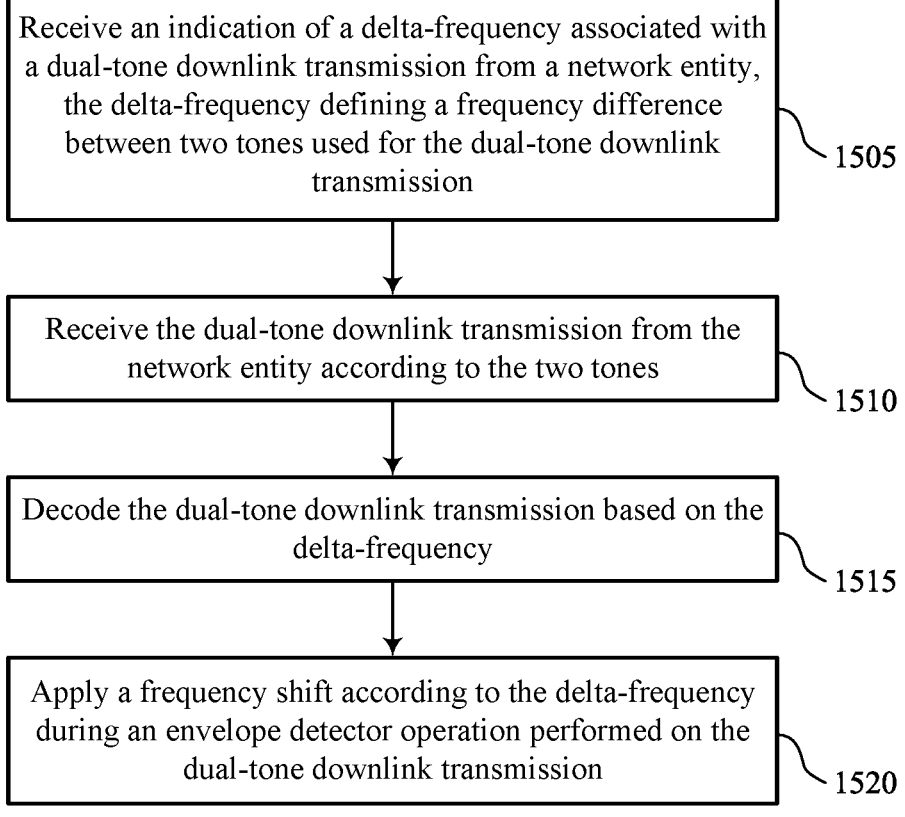

Receive an indication of a delta-frequency associated with a dual-tone downlink transmission from a network entity, the delta-frequency defining a frequency difference between two tones used for the dual-tone downlink transmission

⟍ 1505

Receive the dual-tone downlink transmission from the network entity according to the two tones

⟍ 1510

Decode the dual-tone downlink transmission based on the delta-frequency

⟍ 1515

Apply a frequency shift according to the delta-frequency during an envelope detector operation performed on the dual-tone downlink transmission

Transmit, to a UE, an indication of a delta-frequency associated with a dual-tone downlink transmission to the UE, the delta-frequency defining a frequency difference between two tones used for the dual-tone downlink transmission

1605

Transmit the dual-tone downlink transmission to the UE based on the delta-frequency and the two tones

1610

1600

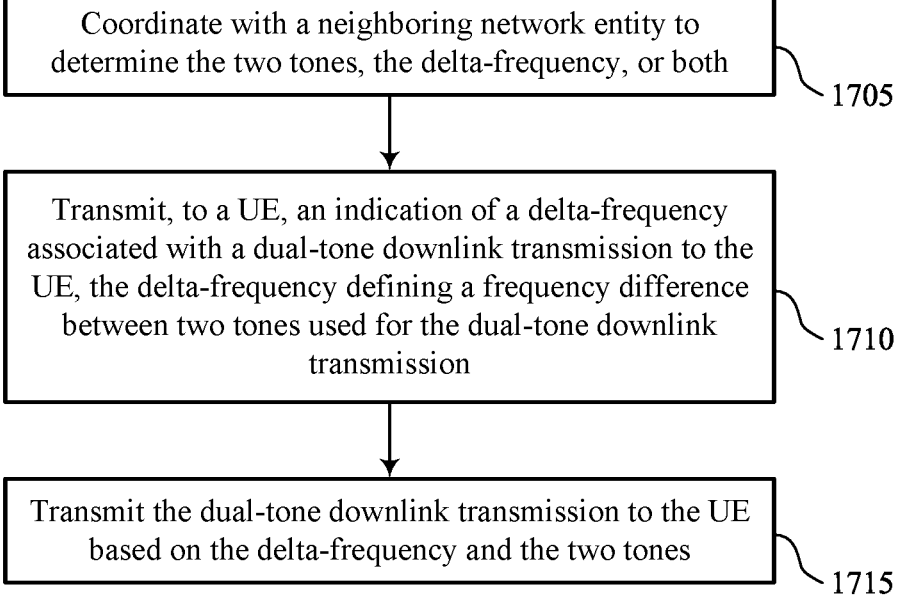

Coordinate with a neighboring network entity to determine the two tones, the delta-frequency, or both

1705

Transmit, to a UE, an indication of a delta-frequency associated with a dual-tone downlink transmission to the UE, the delta-frequency defining a frequency difference between two tones used for the dual-tone downlink transmission

1710

Transmit the dual-tone downlink transmission to the UE based on the delta-frequency and the two tones

ENVELOPE TRACKING USING DUAL TONES

FIELD OF TECHNOLOGY

The following relates to wireless communications, including envelope tracking using dual tones.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support envelope tracking using dual tones. For example, the described techniques provide for a user equipment (UE) that may receive or otherwise obtain an indication of a delta-frequency of a dual-tone downlink transmission from a network entity. The delta-frequency may generally define or otherwise identify a frequency difference between two tones used for the dual-tone downlink transmission. The UE may receive or otherwise obtain the dual-tone downlink transmission over the two tones (e.g., the two tones separated by the delta-frequency in the frequency domain) from the network entity. The UE may decode or otherwise recover the data from the dual-tone downlink transmission based on the delta-frequency. In some aspects, this may include the UE using the delta-frequency to identify the two tones used for dual-tone downlink transmissions from that network entity.

A method for wireless communications at a user equipment UE is described. The method may include receiving an indication of a delta-frequency associated with a dual-tone downlink transmission from a network entity, the delta-frequency defining a frequency difference between two tones used for the dual-tone downlink transmission, receiving the dual-tone downlink transmission from the network entity according to the two tones, and decoding the dual-tone downlink transmission based on the delta-frequency.

An apparatus for wireless communications at a UE is described. The apparatus may include a processor, memory coupled with the processor, and instructions stored in the memory. The instructions may be executable by the processor to cause the apparatus to receive an indication of a delta-frequency associated with a dual-tone downlink transmission from a network entity, the delta-frequency defining a frequency difference between two tones used for the dual-tone downlink transmission, receive the dual-tone downlink transmission from the network entity according to the two tones, and decode the dual-tone downlink transmission based on the delta-frequency.

Another apparatus for wireless communications at a UE is described. The apparatus may include means for receiving an indication of a delta-frequency associated with a dual-tone downlink transmission from a network entity, the delta-frequency defining a frequency difference between two tones used for the dual-tone downlink transmission, means for receiving the dual-tone downlink transmission from the network entity according to the two tones, and means for decoding the dual-tone downlink transmission based on the delta-frequency.

A non-transitory computer-readable medium storing code for wireless communications at a UE is described. The code may include instructions executable by a processor to receive an indication of a delta-frequency associated with a dual-tone downlink transmission from a network entity, the delta-frequency defining a frequency difference between two tones used for the dual-tone downlink transmission, receive the dual-tone downlink transmission from the network entity according to the two tones, and decode the dual-tone downlink transmission based on the delta-frequency.

Some examples of the method, apparatuses, and non-transitory computer-readable medium described herein may further include operations, features, means, or instructions for receiving the indication of the delta-frequency via at least one of a system information message, a master information block message, a system information block, or a combination thereof.

Some examples of the method, apparatuses, and non-transitory computer-readable medium described herein may further include operations, features, means, or instructions for transmitting a capability message indicating a set of delta-frequency values supported by the UE, where the delta-frequency may be based on the capability message.

In some examples of the method, apparatuses, and non-transitory computer-readable medium described herein, decoding the dual-tone downlink transmission may include operations, features, means, or instructions for applying a frequency shift according to the delta-frequency during an envelope detector operation performed on the dual-tone downlink transmission.

In some examples of the method, apparatuses, and non-transitory computer-readable medium described herein, the delta-frequency defines the frequency difference based on a threshold number of resource blocks.

In some examples of the method, apparatuses, and non-transitory computer-readable medium described herein, the delta-frequency may be based on a bandwidth of data conveyed in the dual-tone downlink transmission.

In some examples of the method, apparatuses, and non-transitory computer-readable medium described herein, the delta-frequency may be based on a modulation scheme used to convey data in the dual-tone downlink transmission.

In some examples of the method, apparatuses, and non-transitory computer-readable medium described herein, the modulation scheme includes an amplitude shift keying-based modulation scheme or a phase shift keying-based modulation scheme.

A method for wireless communications at a network entity is described. The method may include transmitting, to a UE, an indication of a delta-frequency associated with a dual-tone downlink transmission to the UE, the delta-frequency defining a frequency difference between two tones used for the dual-tone downlink transmission and transmitting the dual-tone downlink transmission to the UE based on the delta-frequency and the two tones.

An apparatus for wireless communications at a network entity is described. The apparatus may include a processor, memory coupled with the processor, and instructions stored in the memory. The instructions may be executable by the processor to cause the apparatus to transmit, to a UE, an indication of a delta-frequency associated with a dual-tone downlink transmission to the UE, the delta-frequency defining a frequency difference between two tones used for the dual-tone downlink transmission and transmit the dual-tone downlink transmission to the UE based on the delta-frequency and the two tones.

Another apparatus for wireless communications at a network entity is described. The apparatus may include means for transmitting, to a UE, an indication of a delta-frequency associated with a dual-tone downlink transmission to the UE, the delta-frequency defining a frequency difference between two tones used for the dual-tone downlink transmission and means for transmitting the dual-tone downlink transmission to the UE based on the delta-frequency and the two tones.

A non-transitory computer-readable medium storing code for wireless communications at a network entity is described. The code may include instructions executable by a processor to transmit, to a UE, an indication of a delta-frequency associated with a dual-tone downlink transmission to the UE, the delta-frequency defining a frequency difference between two tones used for the dual-tone downlink transmission and transmit the dual-tone downlink transmission to the UE based on the delta-frequency and the two tones.

Some examples of the method, apparatuses, and non-transitory computer-readable medium described herein may further include operations, features, means, or instructions for coordinating with a neighboring network entity to determine the two tones, the delta-frequency, or both.

Some examples of the method, apparatuses, and non-transitory computer-readable medium described herein may further include operations, features, means, or instructions for receiving a capability message indicating a set of delta-frequency values supported by the UE, where the delta-frequency may be based on the capability message.

Some examples of the method, apparatuses, and non-transitory computer-readable medium described herein may further include operations, features, means, or instructions for transmitting the indication of the delta-frequency via at least one of a system information message, a master information block message, a system information block, or a combination thereof.

In some examples of the method, apparatuses, and non-transitory computer-readable medium described herein, the delta-frequency defines the frequency difference based on a threshold number of resource blocks.

In some examples of the method, apparatuses, and non-transitory computer-readable medium described herein, the delta-frequency may be based on a bandwidth of data conveyed in the dual-tone downlink transmission.

In some examples of the method, apparatuses, and non-transitory computer-readable medium described herein, the delta-frequency may be based on a modulation scheme used to convey data in the dual-tone downlink transmission.

In some examples of the method, apparatuses, and non-transitory computer-readable medium described herein, the modulation scheme includes an amplitude shift keying-based modulation scheme or a phase shift keying-based modulation scheme.

BRIEF DESCRIPTION OF THE DRAWINGS

FIGS. 13 through 17 show flowcharts illustrating methods that support envelope tracking using dual tones in accordance with one or more aspects of the present disclosure.

DETAILED DESCRIPTION

Wireless networks may use envelope tracking techniques to detect certain waveform types, such as amplitude shift keying (ASK) waveforms and/or phase shift keying (PSK) waveforms. Such techniques may be used by a low-power device, such as a passive tag and/or a user equipment (UE), to detect the waveforms and recover the encoded data. Such techniques enable simpler designs, such as designs without active radio frequency (RF) components, downlink reception without down conversion, without requiring frequency synchronization, and other advantages. However, envelope tracking waveforms are subject to interference from neighboring network entities. That is, transmissions from the neighboring network entities may have a similar envelope as the serving network entity. This interference may disrupt the envelope tracking operations of the receiving device, thus interfering with communications.

The described techniques relate to improved methods, systems, devices, and apparatuses that support envelope tracking using dual tones. For example, the described techniques provide for a UE that may receive or otherwise obtain an indication of a delta-frequency of a dual-tone downlink transmission from a network entity. The delta-frequency may generally define or otherwise identify a frequency difference between two tones used for the dual-tone downlink transmission. The UE may receive or otherwise obtain the dual-tone downlink transmission over the two tones (e.g., the two tones separated by the delta-frequency in the frequency domain) from the network entity. The UE may decode or otherwise recover the data from the dual-tone downlink transmission based on the delta-frequency. In some aspects, this may include the UE using the delta-frequency to identify the two tones used for dual-tone downlink transmissions from that network entity.

Aspects of the disclosure are initially described in the context of wireless communications systems. Aspects of the disclosure are further illustrated by and described with reference to apparatus diagrams, system diagrams, and flowcharts that relate to envelope tracking using dual tones.

Figure 1:
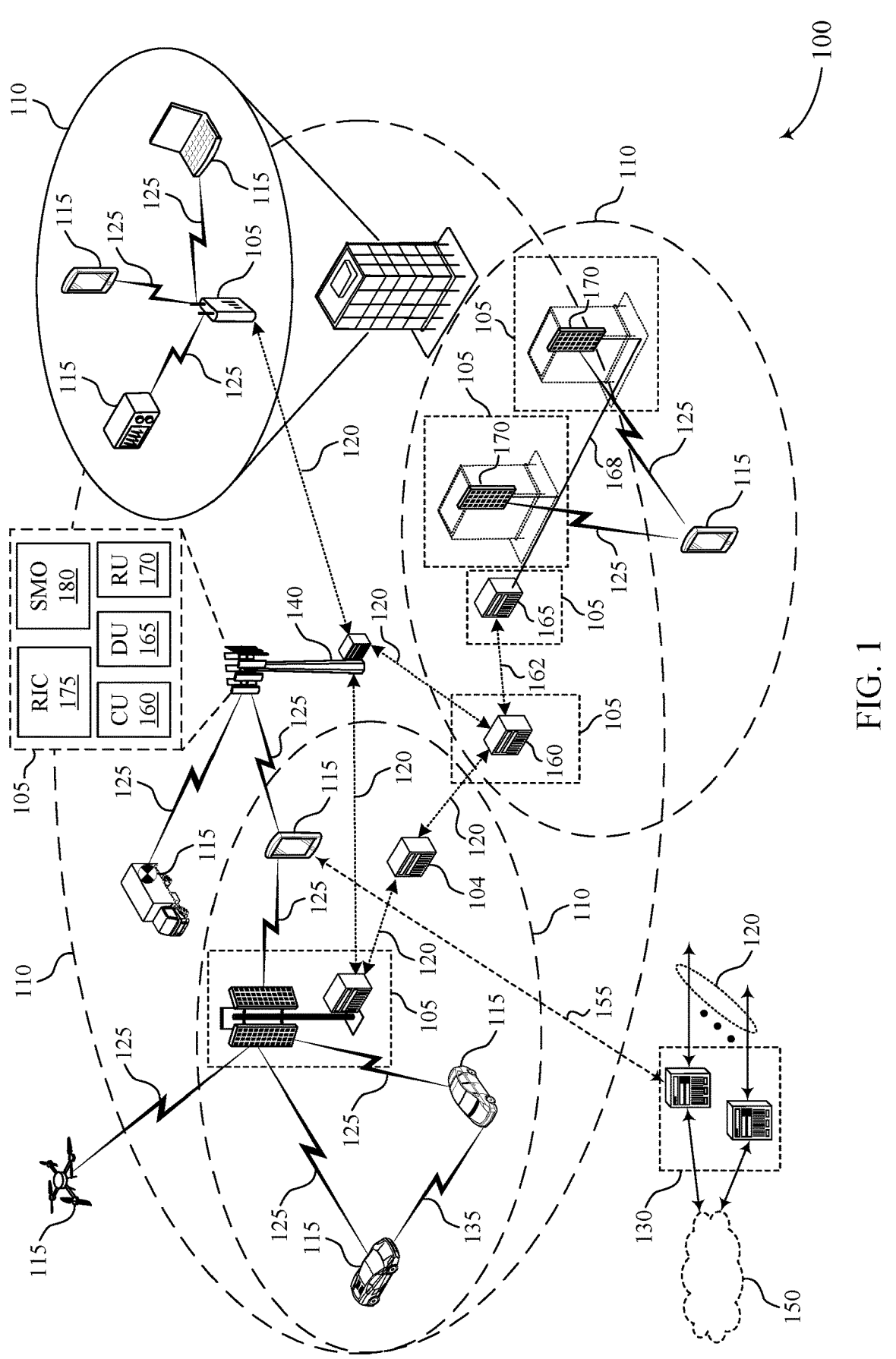
FIG. 1 shows an example of a wireless communications system that supports envelope tracking using dual tones in accordance with one or more aspects of the present disclosure.

FIG. 1 shows an example of a wireless communications system 100 that supports envelope tracking using dual tones in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support envelope tracking using dual tones as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $Ts=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive an indication of a delta-frequency associated with a dual-tone downlink transmission from a network entity 105, the delta-frequency defining a frequency difference between two tones used for the dual-tone downlink transmission. The UE 115 may receive the dual-tone downlink transmission from the network entity 105 according to the two tones. The UE 115 may decode the dual-tone downlink transmission based at least in part on the delta-frequency.

A network entity 105 may transmit, to a UE 115, an indication of a delta-frequency associated with a dual-tone downlink transmission to the UE 115, the delta-frequency defining a frequency difference between two tones used for the dual-tone downlink transmission. The network entity 105 may transmit the dual-tone downlink transmission to the UE 115 based at least in part on the delta-frequency and the two tones.

Figure 2:
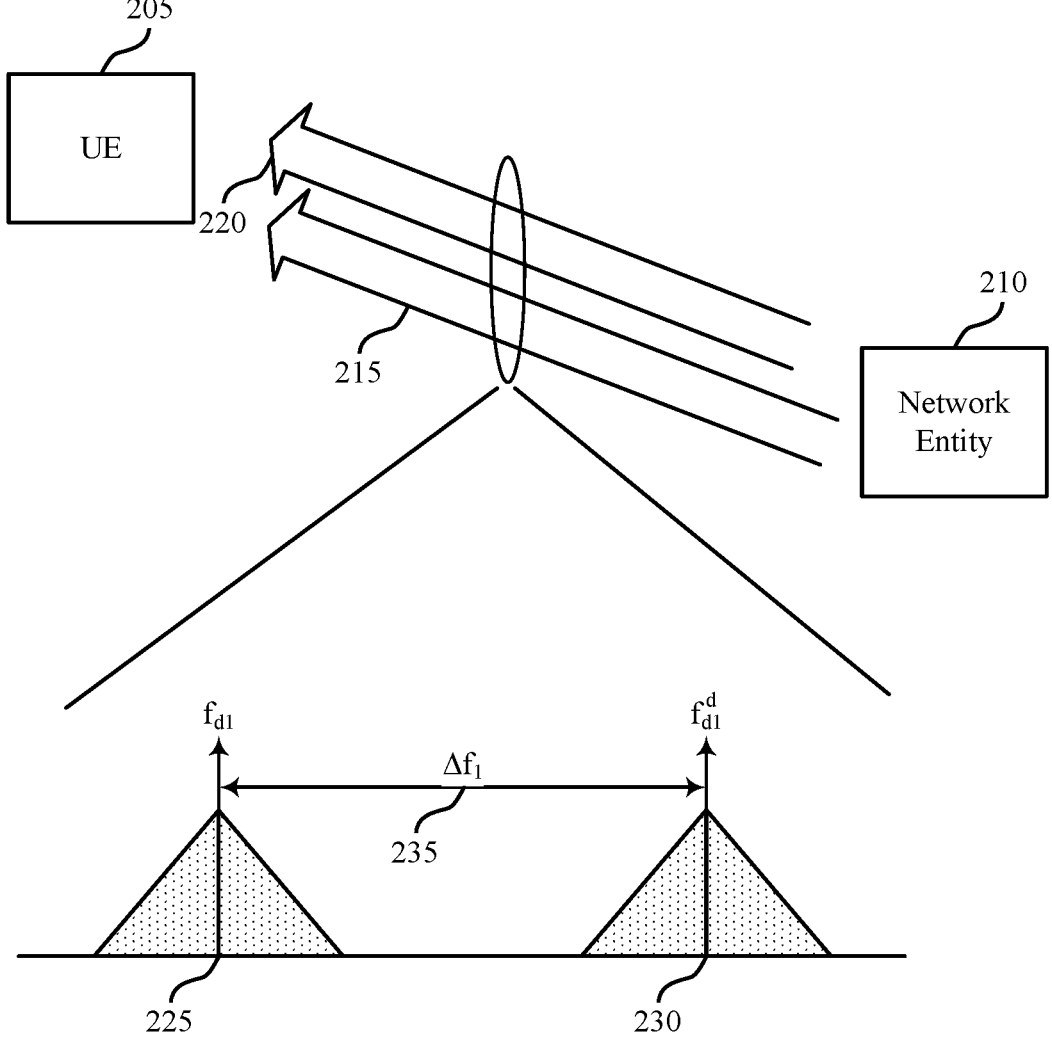
FIG. 2 shows an example of a wireless communications system that supports envelope tracking using dual tones in accordance with one or more aspects of the present disclosure.

FIG. 2 shows an example of a wireless communications system 200 that supports envelope tracking using dual tones in accordance with one or more aspects of the present disclosure. Wireless communications system 200 may implement aspects of wireless communications system 100. Wireless communications system 200 may include a UE 205 and a network entity 210, which may be examples of the corresponding devices described herein.

Wireless communications system 200 may support ambient IoT technologies. These technologies may include the use of envelope tracking using two tones (e.g., dual-tone) transmissions from a transmitting device (e.g., the network entity 210 in this example) to a receiving device (e.g., the UE 205 in this example). The dual-tone transmission may include the transmitting device using an ASK, PSK, or other on-off type modulation scheme, for the transmissions. The transmitting device may then transmit the transmission using two tones (e.g., at two frequencies), with each tone using the ASK, PSK, and the like, modulation to convey the data or information.

The receiving device (e.g., the UE 205) may utilize envelope tracking techniques to detect the ASK/PSK modulated signal. The envelope tracking techniques may be performed by the receiving device without using a local oscillator. That is, envelope tracking may be applied by a low-tier device without active RF components. This enables downlink reception without down conversion and omits frequency synchronization or carrier frequency offset (CFO) requirements. However, conventional envelope tracking techniques using a single tone suffer from interference by neighboring transmitting device's (e.g., neighboring network entities or cells) transmissions. For example, the transmissions from the neighboring devices may have a similar envelope as the single-tone transmission, even when FDD techniques are applied to the transmissions. That is, transmissions from neighboring devices may have a sufficiently overlapping envelope relative to the single-tone transmission, which may cause interference at the receiving device employing envelope tracking techniques to recover the data or information.

Accordingly, aspects of the techniques described herein provide various techniques for dual-tone downlink transmissions from the network entity 210 to the UE 205. This may include, at 215 the network entity 210 transmitting or otherwise conveying (and the UE 205 receiving or otherwise obtaining) an indication of a delta frequency 235 associated with a dual-tone downlink transmission from the network entity 210 to the UE 205. Broadly, the delta frequency 235 may define the frequency difference (e.g., in the frequency domain) between the two tones used for the dual-tone downlink transmission from the network entity 210. In the non-limiting example illustrated in FIG. 2, the two tones may include tone 225 and tone 230, which are the two tones used for the dual-tone downlink transmission. The delta frequency 235 in this example may define the frequency offset or frequency difference between tone 225 and tone 230.

In some examples, this may include the network entity 210 transmitting a data waveform $a_1(t)$ at two central frequencies, $f_{d1}$ and $f_{d_2}$, where $f_{d_2}$ may be referred to as $$f_{d_1}^d.$$

The data waveform, $a_1(t)$, may be an example of the baseband data signal, which may be an ASK/PSK modulated signal or any other on-off type modulated signal. The transmitted signal from the network entity 210 may be written as:

$$s_1(t) = a_1(t)\cos\left(2\pi f_{d_1} t\right) + a_1(t)\cos\left(2\pi f_{d_1}^d t\right).$$

The two tones (e.g., tone 225 and tone 230) may be separated by a frequency of $$\Delta f_1 = f_{d_1}^d - f_{d_1},$$

where $\Delta f_1$ refers to the delta frequency 235.

In some examples, the delta frequency 235 may be associated with the network entity 210, such as the network entity 210 may apply the delta frequency 235 that is different from delta frequencies applied by neighboring network entities or other transmitting devices. For example, the network entity 210 may transmit or otherwise provide (and the UE 205 may receive or otherwise obtain) an indication of the delta frequency 235 (e.g., its delta frequency) via a broadcast message and/or via a UE-specific message. In some example, this may include the indication of the delta frequency 235 being conveyed in a system information (SI) message, in a master information block (MIB) message, in a system information block (SIB) message, in RRC signaling, in medium access control-control element (MAC-CE) signaling, and/or in downlink control information (DCI) signaling. In some examples, the indication of the delta frequency 235 may be provided in a DCI scheduling the downlink transmission. In some examples, the indication of the delta frequency 235 may be broadcast or multicast to any UE within the coverage area of the network entity 210 (e.g., separately from the DCI grant scheduling the downlink transmission).

Accordingly, at 220 the network entity 210 may transmit or otherwise provide (and the UE 205 may receive or otherwise obtain) the dual-tone downlink transmission according to the two tones. For example, the network entity 210 may transmit the downlink transmission at tone 225 and at tone 230. As discussed, tone 225 may be separated from tone 230 in the frequency domain by the delta frequency 235. The dual-tone downlink transmission may use ASK and/or PSK modulation (e.g., in order to create the envelope shape that conveys the data or information to the UE 205).

The UE 205 may decode the dual-tone downlink transmission based, at least to some degree, on the delta frequency 235. For example, the UE 205 may input the received dual-tone downlink transmission into an envelope detector, followed by a low-pass filter (LPF), and then a comparator to recover the data or information being conveyed via the envelope.

In some examples, this may include the UE 205 applying or otherwise using a frequency shift according to the delta frequency 235 during an envelope detector operation performed on the dual-tone downlink transmission. As one non-limiting example and in an additive white gaussian noise (AWGN) channel, the envelope of the received dual-tone downlink transmission at the UE 205 (e.g., by removing the higher frequency terms) can be approximated as $$r_1(t) = s_1^2(t) = 2a_1^2(t) + 2a_1^2(t)\cos(2\pi\Delta f_1 t).$$

For $\Delta f_1$ being larger than the frequency span of $$a_1^2(t),$$

the transmitted signal $a_1(t)$, can be recovered from the envelope by first applying a shift of $\Delta f_1$ on $r_1(t)$ followed by a low pass filter. In traditional envelope tracking (e.g., without using dual tones), $a_1(t)$ is obtained by passing through $r_1(t)$ through a low pass filter (e.g., from the DC term $$a_1^2(t)$$

Accordingly, the UE 205 may receive and decode the dual-tone downlink transmission from the network entity 210 by applying the delta frequency 235 during envelope detection operations. The delta frequency 235 may be used, in some aspects, by the UE 205 to identify or otherwise determine that the received downlink transmission is from the network entity 210 rather than being an interfering transmission with an overlapping envelope from a neighboring network entity. That is, the delta frequency 235 may be used to distinguish the downlink transmission of the network entity 210 from interfering transmissions from neighboring devices.

In some examples, this may include the network entity 210 transmitting the information of $\Delta_f$ to the UE 205 as a part of SI/SIB/MIB. The UE 205 decodes this information and finds the value of $\Delta_f$. The network entity 210 then transmits the data with the pre-configured $\Delta_f$ and the UE 205 decodes the information using the appropriate frequency shift ($\Delta_f$) and filter in the envelop tracking operations.

Figure 3:
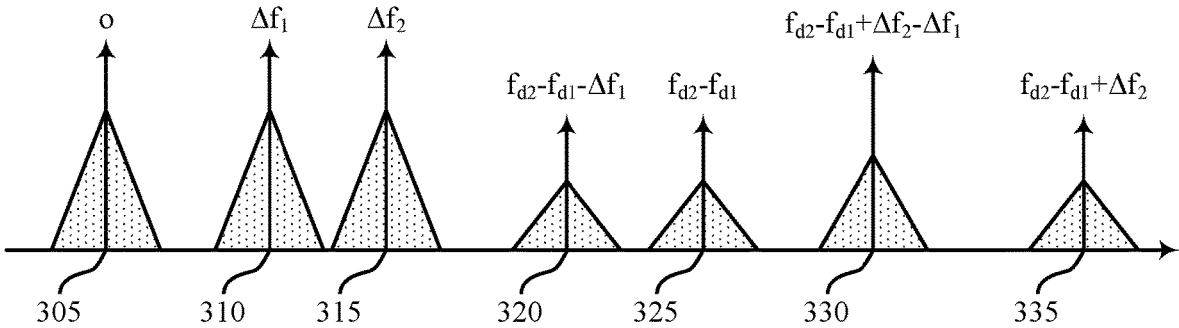
FIG. 3 shows an example of a tone configuration that supports envelope tracking using dual tones in accordance with one or more aspects of the present disclosure.

FIG. 3 shows an example of a tone configuration 300 that supports envelope tracking using dual tones in accordance with one or more aspects of the present disclosure. Tone configuration 300 may implement aspects of wireless communications system 100 and/or aspects of wireless communications system 200. Aspects of tone configuration 300 may be implemented at or implemented by a UE and/or network entity, which may be examples of the corresponding devices described herein.

As discussed above, the techniques described herein provide for a dual-tone downlink transmission to a UE to be based, at least to some degree, on a delta frequency. The delta frequency broadly defines the frequency difference or frequency offset between the two tones used for the dual-tone downlink transmission. The network entity may provide an indication of the delta frequency via SI/SIB/MIB signaling, RRC signaling, MAC-CE signaling, and/or via a DCI. The receiving device (e.g., a UE) may identify or otherwise determine the delta frequency and receive the dual-tone downlink transmission from the network entity on the two tones. The UE may then apply the delta frequency when recovering the data or information. For example, the UE may apply the delta frequency during envelope detection operations using an envelope detector, LPF, and the like.

In some aspects, the delta frequency to be used for the dual-tone downlink transmission may be based on coordination with neighboring transmitting devices (e.g., neighboring network entities) to identify or otherwise determine the two tones and/or the delta frequency to be applied. Tone configuration 300 illustrates a non-limiting example of aspects of such coordination between the neighboring network entities. In particular, tone configuration 300 illustrates non-limiting examples of considerations and/or factors to be considered and coordinated between the neighboring network entities when identifying or otherwise determining the delta frequency difference and/or the two tones.

For the case of two network entity transmissions interfering with each other, the transmitted signals may be represented using:

$$s_1(t) = a_1(t)\cos\left(2\pi f_{d_1} t\right) + a_1(t)\cos\left(2\pi f_{d_1}^d t\right)$$

(e.g., the dual-tone downlink transmission from a first network entity) and $$s_2(t) = a_2(t)\cos\left(2\pi f_{d_2} t\right) + a_2(t)\cos\left(2\pi f_{d_2}^d t\right)$$

(e.g., the dual-tone downlink transmission from the second network entity. In the case of a single tone downlink transmission, the received signal at the UE after envelop tracking will be $$a_1^2(t) + a_2^2(t),$$

and thus interference cannot be removed even with FDM, $f_{d_1} \neq f_{d_2}$. In this case, the interference may be avoided if the network entities select $f_{d_2} > f_{d_1} + \Delta f_1 + \Delta f_2 + \Delta f_a$ and $\Delta f_2 > \Delta f_1 + \Delta f_a$, where $\Delta f_a$ is the bandwidth of the signals $$a_1^2(t)$$

and $$a_2^2(t).$$

This may include maintaining a certain frequency allocation of the data signals of the two neighboring network entities. A non-limiting example selection of the delta-frequency and/or the two tones for an ambient-IoT channel with $\Delta d = 180$ KHz and $\Delta f_a = 360$ KHz: $\Delta f_1 = 180$ KHz, $\Delta f_2 = 540$ KHz, $f_{d_2} = f_{d_1} + 1080$ KHz.

More particularly, for the case of two network entity transmissions, the received signal can be written as $$r_1(t) = 2a_1^2(t) + 2a_2^2(t) + 2a_1^2(t)\cos(2\pi\Delta f_1 t) +$$
$$2a_2^2(t)\cos(2\pi\Delta f_2 t) + 2a_1(t)a_2(t)\left[\cos\left(2\pi\left(f_{d_2}^d - f_{d_1}\right)t\right) +\right.$$
$$\left.\cos\left(2\pi\left(f_{d_1}^d - f_{d_2}\right)t\right) + \cos\left(2\pi\left(f_{d_2} - f_{d_1}\right)t\right) + \cos\left(2\pi\left(f_{d_2}^d - f_{d_1}^d\right)t\right)\right].$$

The first UE may recover the signal of a first network entity by applying the delta frequency shift of $\Delta f_1$ followed by a low pass filter and the second UE may recover the signal from the second network entity by applying the delta frequency shift of $\Delta f_2$ followed by a low pass filter. To avoid the interference from the other terms (e.g., from the terms corresponding to tone 320, tone 325, tone 330, and tone 335), the following conditions may be determined or otherwise identified by the coordinating network entities: $\Delta f_2 > \Delta f_1 + \Delta f_a$ (e.g., assume $\Delta f_a$ is the bandwidth of the signal $$a_1^2(t) \text{ and } a_2^2(t)),$$

$$f_{d_2}^d - f_{d_1} = \Delta f_2 + f_{d_2} - f_{d_1} \text{ and } f_{d_1}^d - f_{d_2} = \Delta f_1 + f_{d_1} - f_{d_2},$$

may be outside the frequency range of $\Delta f_1 + \Delta f_a$ and $\Delta f_2 + \Delta f_a$. Such conditions may be satisfied for $f_{d_2} > f_{d_1} + \Delta f_1 + \Delta f_2 + \Delta f_a$ and for $\Delta f_2 > \Delta f_1 + \Delta f_a$.

In the non-limiting example illustrated in FIG. 3, this may be based on tone 305 corresponding to a reference tone (e.g., $f_{d_1}$ for the first network entity and $f_{d_2}$ for the second network entity). Tone 310 may correspond to the second tone of the two tones $$\left(\text{e.g., } f_{d_1}^d\right)$$

of the first network entity and tone 315 may correspond to the second tone of the tow tones $$\left(\text{e.g., } f_{d_2}^d\right)$$

of the second network entity. The tone 305 is separated from the tone 310 by the first delta frequency (e.g., $\Delta f_1$) of the first network entity and tone 305 is separated from the tone 315 by the second delta frequency (e.g., $\Delta f_2$) of the second network entity. In this example, tone 305 and tone 310 may carry the data or information conveyed in a dual-tone downlink transmission from the first network entity to the first UE. Tone 305 and tone 315 may carry the data or information conveyed in the dual-tone downlink transmission from the second network entity to the second UE. Tone 320, tone 325, tone 330 and tone 335, which are based on aspects of $f_{d_1}$, $f_{d_2}$, $\Delta f_1$, and $\Delta f_2$, may be interfering tones. These interfering tones may be excluded by the receiving UEs based on the delta frequency associated with each network entity.

In some examples, the network entity may coordinate with multiple neighboring network entities to identify or otherwise determine the delta frequency and/or the two tones. In the case of downlink transmissions from three network entities, the interference can be removed if: $f_{d_2} > f_{d_1} + \Delta f_1 + \Delta f_3 + \Delta f_a$, $f_{d_3} > f_{d_2} + \Delta f_2 + \Delta f_3 + \Delta f_a$, and $\Delta f_2 > \Delta f_1 + \Delta f_a$, and $\Delta f_3 > \Delta f_2 + \Delta f_a$. This can be generalized to a m number of network entities using: $f_{d_2} > f_{d_1} + \Delta f_1 + \Delta f_m + \Delta f_a, \ldots, f_{d_3} > f_{d_2} + \Delta f_2 + \Delta f_m + \Delta f_a, \ldots, f_{d_m} > f_{d_{m-1}} + \Delta f_{m-1} + \Delta f_m + \Delta f_a$, and $\Delta f_2 > \Delta f_1 + \Delta d$, $\Delta f_3 > \Delta f_2 + \Delta d, \ldots, \Delta f_m > \Delta f_{m-1} + \Delta f_a$.

Some networks may rely on a solution based on helper tones to remove the interference. The dual-tone transmissions discussed herein may have the following differences compared to the helper tones: the interference pattern for dual tones contains the product term $a_1(t) \, a_2(t)$ instead of $a_1(t)$ for the helper tone, which may be due to the random data, and the term $a_1(t) \, a_2(t)$ will be generally lower and provides an improved performance over helper tones. Dual tones may use a higher bandwidth for transmission compared to the helper tone based transmissions. The frequency separation used for the dual-tone transmission may depend on the bandwidth of $$a_1^2(t)$$

instead of $a_1(t)$ for the helper tone, which is higher depending on the transmitted waveform.

Accordingly, neighboring network entities may coordinate their respective two tones and/or delta frequencies based on the features discussed above to mitigate interference at the receiving device. Such coordination may be performed via a wireless link and/or via a wired link between the neighboring network entities. In some examples, the coordinating network entities—alone or in coordination—may consider additional features or aspects when identifying or otherwise determining the two tones and/or delta frequency.

That is, the neighboring network entities may first decide the position of data signals (e.g., the two tones and/or delta frequency) based on the conditions discussed above. Additionally, or alternatively, the position of dual tones (e.g., $\Delta_f$) may depend on the bandwidth of the data (e.g., the number of IoT channels) and/or the type of waveform to be transmitted (e.g., may depend on the bandwidth of $$a_1^2(t),$$

such as the bandwidth of the data carried or otherwise conveyed in the dual-tone downlink transmission). For example, the square of a phase reverse-ASK (PR-ASK) waveform may have a lower bandwidth compared to a double sideband-ASK (DSB-ASK) waveform.

Additionally, or alternatively, the $\Delta_f$ can also be selected to avoid the PDSCH interference (e.g., other than network entity interference). For example, by selecting a $\Delta_f$ larger than two resource blocks (RBs), the network entities can avoid two RB narrow band PDSCH interference. Accordingly, the delta frequency and/or two tones may be based on the threshold number of RBs.

Additionally, or alternatively, the value of $\Delta_f$ can also be selected based on the UE's capability. In this case, UE may first transmit information about the different values of $\Delta_f$ that it can support to the network entity, and the network entity may select a value of $\Delta_f$ from the list. In some examples, this may include the UE transmitting or otherwise conveying a capability message (e.g., a UE capability message) that carries or otherwise conveys an indication of a set of delta frequency values supported by the UE. The network entity receiving the UE capability message may select the $\Delta_f$ from the set of delta frequency values supported by the UE.

Figure 4:
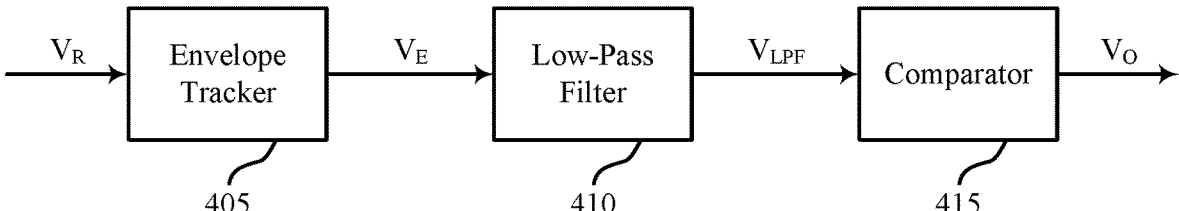
FIG. 4 shows an example of a envelope detection system that supports envelope tracking using dual tones in accordance with one or more aspects of the present disclosure.

FIG. 4 shows an example of an envelope detection system 400 that supports envelope tracking using dual tones in accordance with one or more aspects of the present disclosure. Envelope detection system 400 may implement aspects of wireless communications system 100, wireless communications system 200, and/or aspects of tone configuration 300. Aspects of envelope detection system 400 may be implemented at or implemented by a UE, which may be an example of the corresponding device described herein. Envelope detection system 400 may include an envelope tracker 405, a low-pass filter 410, and a comparator 415, which may be components and/or functions within a receiving device. The receiving device may be a UE, which may be an example of the corresponding device described herein.

As discussed above, the techniques described herein provide for a dual-tone downlink transmission to a UE to be based, at least to some degree, on a delta frequency. The delta frequency broadly defines the frequency difference or frequency offset between the two tones used for the dual-tone downlink transmission. The network entity may provide an indication of the delta frequency via SI/SIB/MIB signaling, RRC signaling, MAC-CE signaling, and/or via a DCI. The receiving device (e.g., a UE) may identify or otherwise determine the delta frequency and receive the dual-tone downlink transmission from the network entity on the two tones. The UE may then apply the delta frequency when recovering the data or information. For example, the UE may apply the delta frequency during envelope detection operations using the envelope tracker 405, the low-pass filter 410, and the comparator 415, among other components and/or functions of the UE.

For example, the UE may input the received dual-tone downlink transmission (e.g., $V_R$) to the envelope tracker 405. The received dual-tone downlink transmission may be shifted by the delta-frequency associated with the network entity. As one non-limiting example, this may include the second tone of the two tones being downshifted or the first tone of the two tones being upshifted by the delta-frequency. In another non-limiting example, this may include the UE recovering the envelope from the first tone and then from the second tone based on the delta-frequency. The UE may compare the recovered envelope from the two tones to confirm successful receipt of the dual-tone downlink transmission. In some examples, this may include the envelope tracker recovering the effective voltage term of the received dual-tone downlink transmission in order to initially recover the envelope.

The output of the envelope tracker 405 (e.g., $V_E$) may be provided to the low-pass filter 410, which may remover the high frequency components-thus recovering at least aspects of the envelope conveyed in the dual-tone downlink transmission. The output of the low-pass filter 410 may be provided to the comparator 415, which may compare the recovered envelope to a set or fixed value to develop a square wave output (e.g., $V_O$). The square wave output may generally represent the data or information conveyed in the dual-tone downlink transmission.

Figure 5:
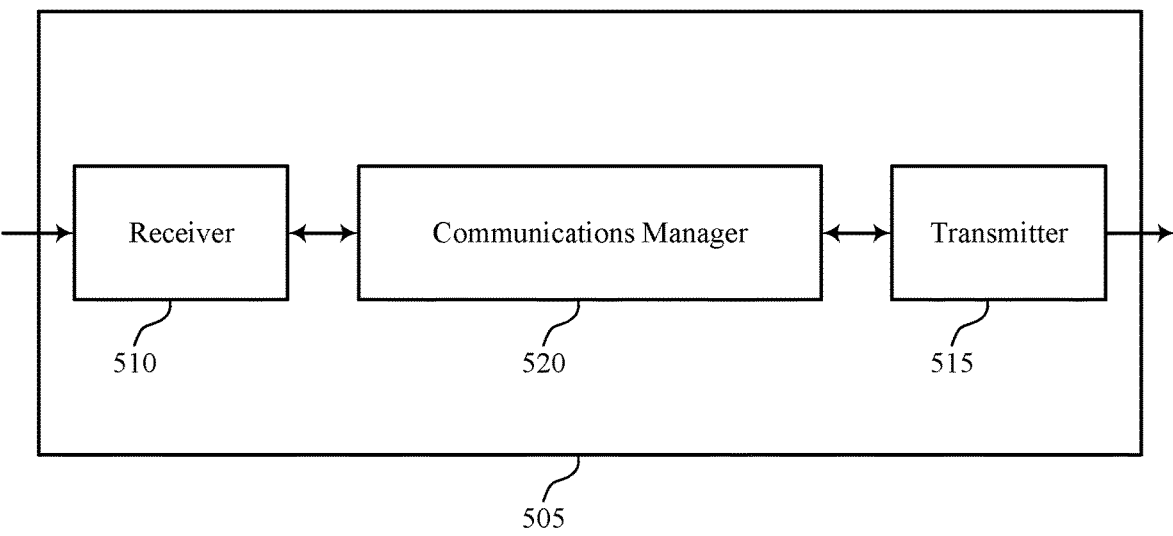
FIGS. 5 and 6 show block diagrams of devices that support envelope tracking using dual tones in accordance with one or more aspects of the present disclosure.

FIG. 5 shows a block diagram 500 of a device 505 that supports envelope tracking using dual tones in accordance with one or more aspects of the present disclosure. The device 505 may be an example of aspects of a UE 115 as described herein. The device 505 may include a receiver 510, a transmitter 515, and a communications manager 520.

The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to envelope tracking using dual tones). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to envelope tracking using dual tones). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of envelope tracking using dual tones as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 is capable of, configured to, or operable to support a means for receiving an indication of a delta-frequency associated with a dual-tone downlink transmission from a network entity, the delta-frequency defining a frequency difference between two tones used for the dual-tone downlink transmission. The communications manager 520 is capable of, configured to, or operable to support a means for receiving the dual-tone downlink transmission from the network entity according to the two tones. The communications manager 520 is capable of, configured to, or operable to support a means for decoding the dual-tone downlink transmission based on the delta-frequency.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for dual-tone downlink transmissions from a network entity based on a delta-frequency between the two tones.

Figure 6:
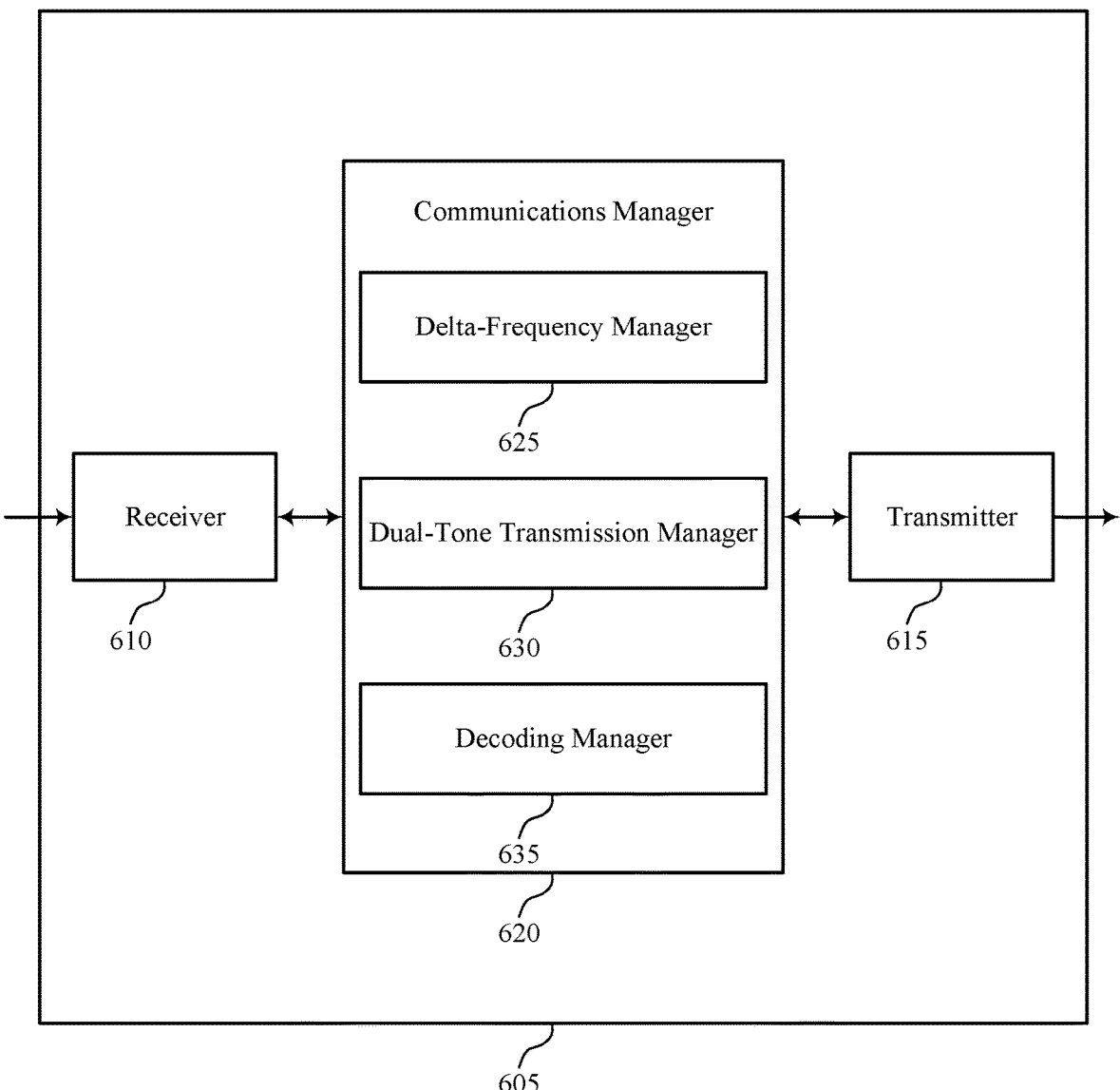

FIG. 6 shows a block diagram 600 of a device 605 that supports envelope tracking using dual tones in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to envelope tracking using dual tones). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to envelope tracking using dual tones). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of envelope tracking using dual tones as described herein. For example, the communications manager 620 may include a delta-frequency manager 625, a dual-tone transmission manager 630, a decoding manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The delta-frequency manager 625 is capable of, configured to, or operable to support a means for receiving an indication of a delta-frequency associated with a dual-tone downlink transmission from a network entity, the delta-frequency defining a frequency difference between two tones used for the dual-tone downlink transmission. The dual-tone transmission manager 630 is capable of, configured to, or operable to support a means for receiving the dual-tone downlink transmission from the network entity according to the two tones. The decoding manager 635 is capable of, configured to, or operable to support a means for decoding the dual-tone downlink transmission based on the delta-frequency.

Figure 7:
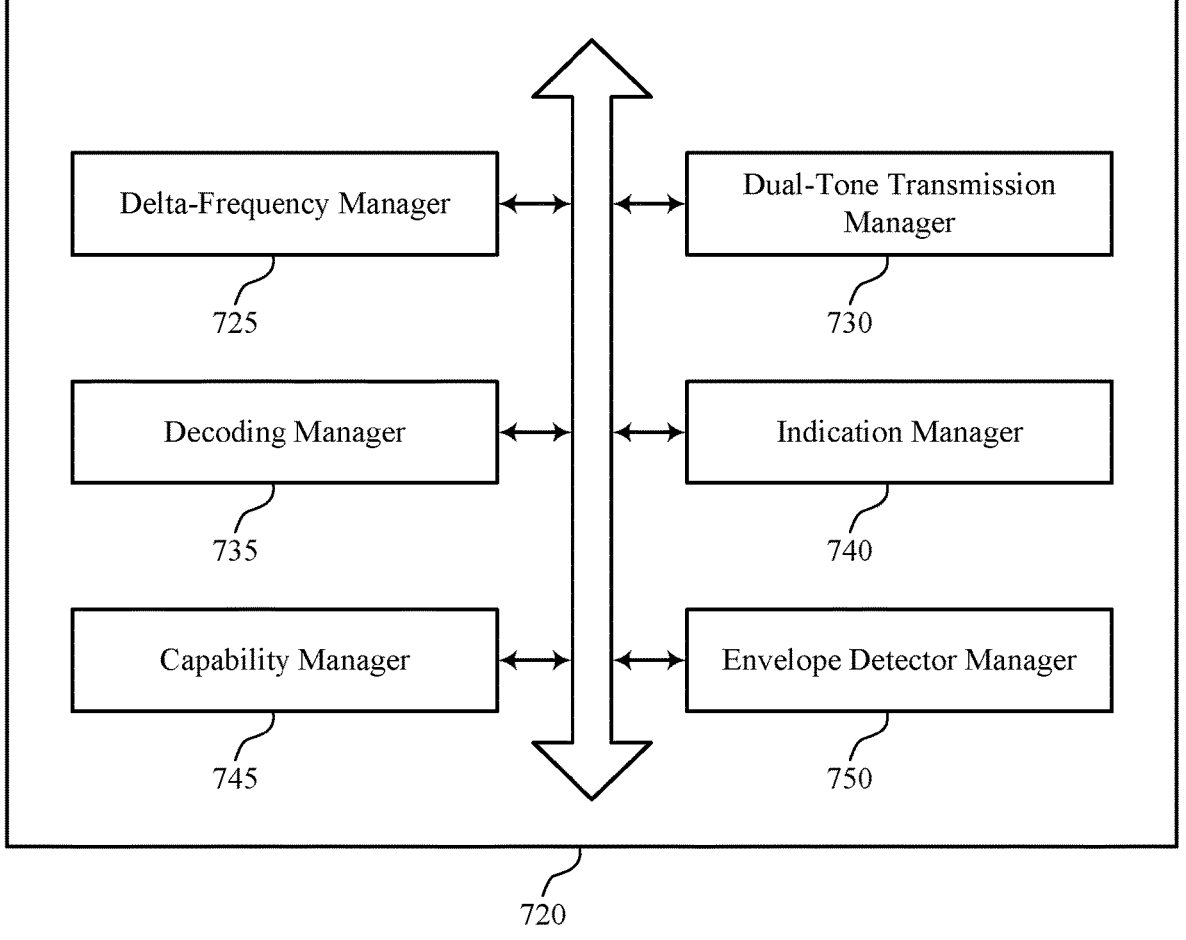
FIG. 7 shows a block diagram of a communications manager that supports envelope tracking using dual tones in accordance with one or more aspects of the present disclosure.

FIG. 7 shows a block diagram 700 of a communications manager 720 that supports envelope tracking using dual tones in accordance with one or more aspects of the present disclosure. The communications manager 720 may be an example of aspects of a communications manager 520, a communications manager 620, or both, as described herein. The communications manager 720, or various components thereof, may be an example of means for performing various aspects of envelope tracking using dual tones as described herein. For example, the communications manager 720 may include a delta-frequency manager 725, a dual-tone transmission manager 730, a decoding manager 735, an indication manager 740, a capability manager 745, an envelope detector manager 750, or any combination thereof. Each of these components may communicate, directly or indirectly, with one another (e.g., via one or more buses).

The communications manager 720 may support wireless communications at a UE in accordance with examples as disclosed herein. The delta-frequency manager 725 is capable of, configured to, or operable to support a means for receiving an indication of a delta-frequency associated with a dual-tone downlink transmission from a network entity, the delta-frequency defining a frequency difference between two tones used for the dual-tone downlink transmission. The dual-tone transmission manager 730 is capable of, configured to, or operable to support a means for receiving the dual-tone downlink transmission from the network entity according to the two tones. The decoding manager 735 is capable of, configured to, or operable to support a means for decoding the dual-tone downlink transmission based on the delta-frequency.

In some examples, the indication manager 740 is capable of, configured to, or operable to support a means for receiving the indication of the delta-frequency via at least one of a SI message, a MIB message, a SIB, or a combination thereof.

In some examples, the capability manager 745 is capable of, configured to, or operable to support a means for transmitting a capability message indicating a set of delta-frequency values supported by the UE, where the delta-frequency is based on the capability message.

In some examples, to support decoding the dual-tone downlink transmission, the envelope detector manager 750 is capable of, configured to, or operable to support a means for applying a frequency shift according to the delta-frequency during an envelope detector operation performed on the dual-tone downlink transmission.

In some examples, the delta-frequency defines the frequency difference based on a threshold number of resource blocks. In some examples, the delta-frequency is based on a bandwidth of data conveyed in the dual-tone downlink transmission. In some examples, the delta-frequency is based on a modulation scheme used to convey data in the dual-tone downlink transmission. In some examples, the modulation scheme includes an amplitude shift keying-based modulation scheme or a phase shift keying-based modulation scheme.

Figure 8:
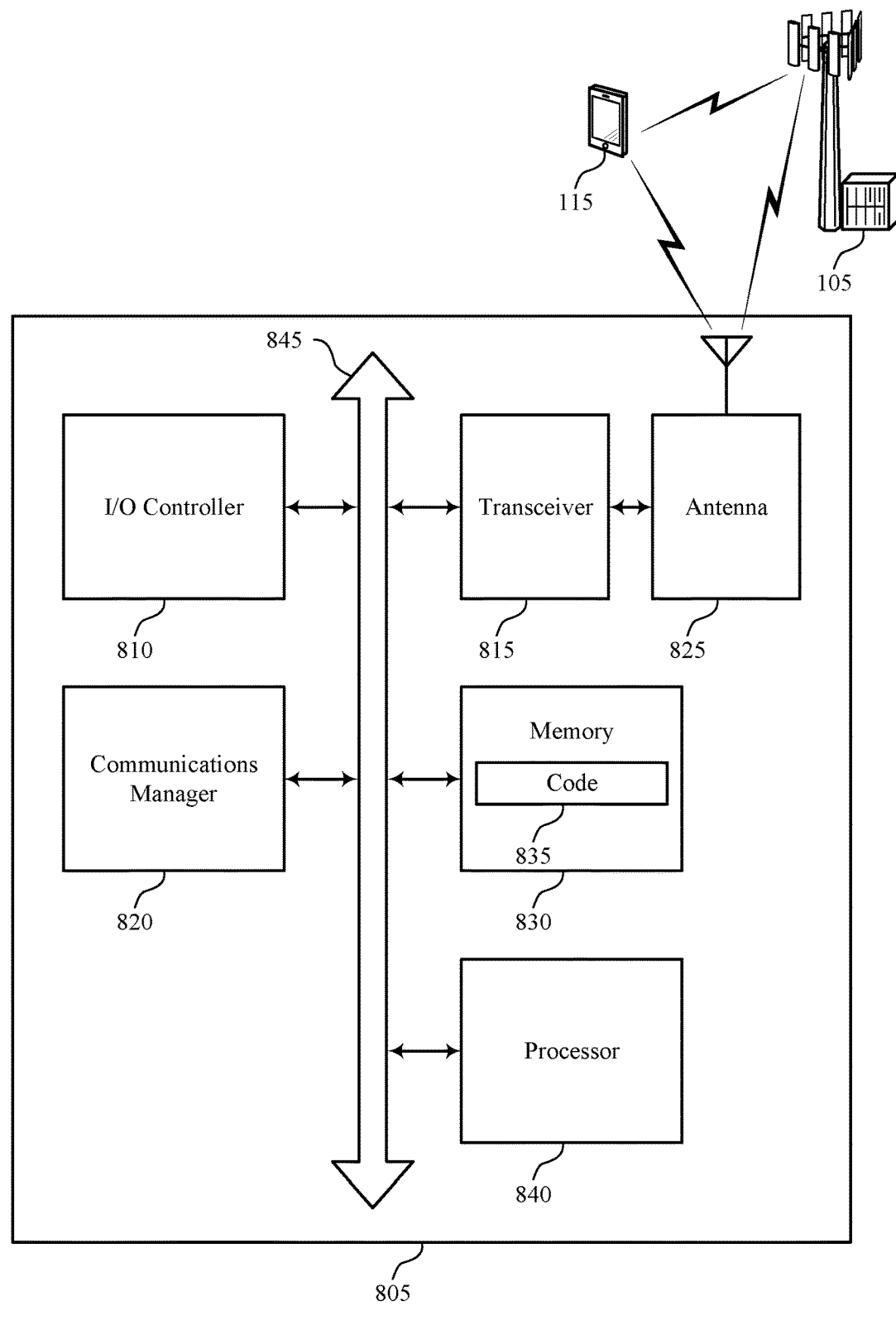
FIG. 8 shows a diagram of a system including a device that supports envelope tracking using dual tones in accordance with one or more aspects of the present disclosure.

FIG. 8 shows a diagram of a system 800 including a device 805 that supports envelope tracking using dual tones in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting envelope tracking using dual tones). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 is capable of, configured to, or operable to support a means for receiving an indication of a delta-frequency associated with a dual-tone downlink transmission from a network entity, the delta-frequency defining a frequency difference between two tones used for the dual-tone downlink transmission. The communications manager 820 is capable of, configured to, or operable to support a means for receiving the dual-tone downlink transmission from the network entity according to the two tones. The communications manager 820 is capable of, configured to, or operable to support a means for decoding the dual-tone downlink transmission based on the delta-frequency.

By including or configuring the communications manager 820 in accordance with examples as described herein, the device 805 may support techniques for dual-tone downlink transmissions from a network entity based on a delta-frequency between the two tones.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of envelope tracking using dual tones as described herein, or the processor 840 and the memory 830 may be otherwise configured to perform or support such operations.

Figure 9:
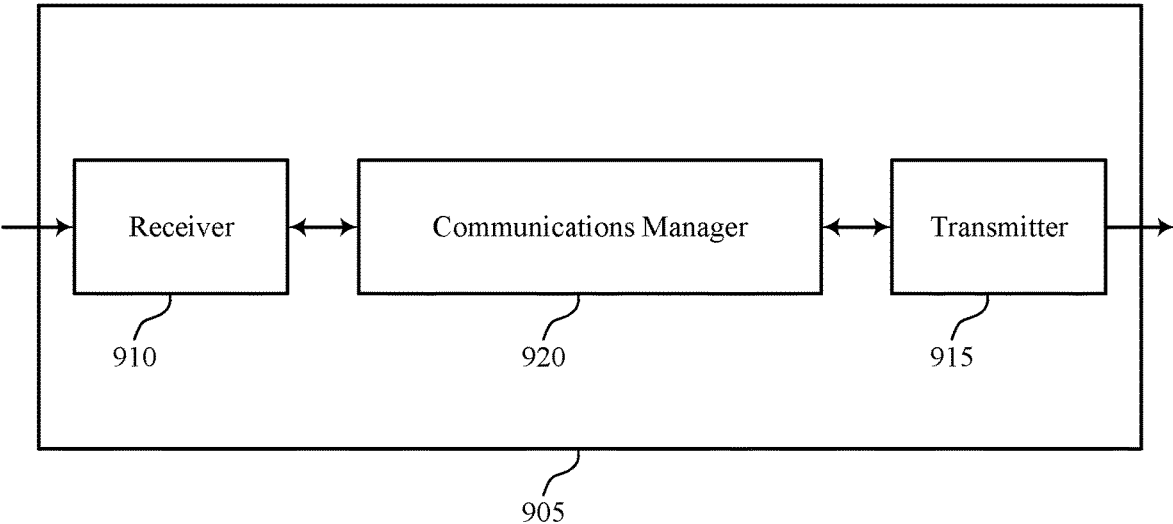
FIGS. 9 and 10 show block diagrams of devices that support envelope tracking using dual tones in accordance with one or more aspects of the present disclosure.

FIG. 9 shows a block diagram 900 of a device 905 that supports envelope tracking using dual tones in accordance with one or more aspects of the present disclosure. The device 905 may be an example of aspects of a network entity 105 as described herein. The device 905 may include a receiver 910, a transmitter 915, and a communications manager 920. The device 905 may also include a processor.

Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of envelope tracking using dual tones as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for transmitting, to a UE, an indication of a delta-frequency associated with a dual-tone downlink transmission to the UE, the delta-frequency defining a frequency difference between two tones used for the dual-tone downlink transmission. The communications manager 920 is capable of, configured to, or operable to support a means for transmitting the dual-tone downlink transmission to the UE based on the delta-frequency and the two tones.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for dual-tone downlink transmissions from a network entity based on a delta-frequency between the two tones.

Figure 10:
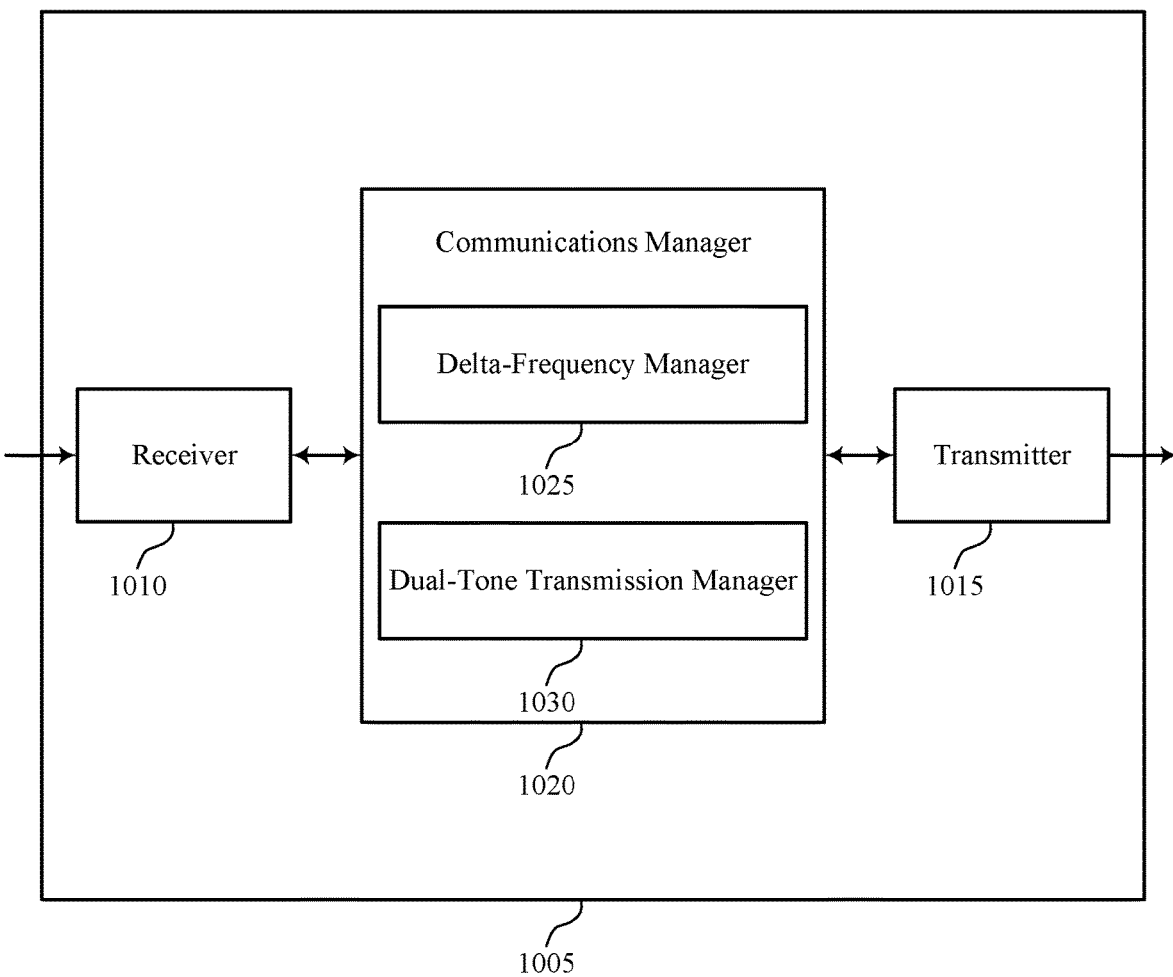

FIG. 10 shows a block diagram 1000 of a device 1005 that supports envelope tracking using dual tones in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of envelope tracking using dual tones as described herein. For example, the communications manager 1020 may include a delta-frequency manager 1025 a dual-tone transmission manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The delta-frequency manager 1025 is capable of, configured to, or operable to support a means for transmitting, to a UE, an indication of a delta-frequency associated with a dual-tone downlink transmission to the UE, the delta-frequency defining a frequency difference between two tones used for the dual-tone downlink transmission. The dual-tone transmission manager 1030 is capable of, configured to, or operable to support a means for transmitting the dual-tone downlink transmission to the UE based on the delta-frequency and the two tones.

Figure 11:
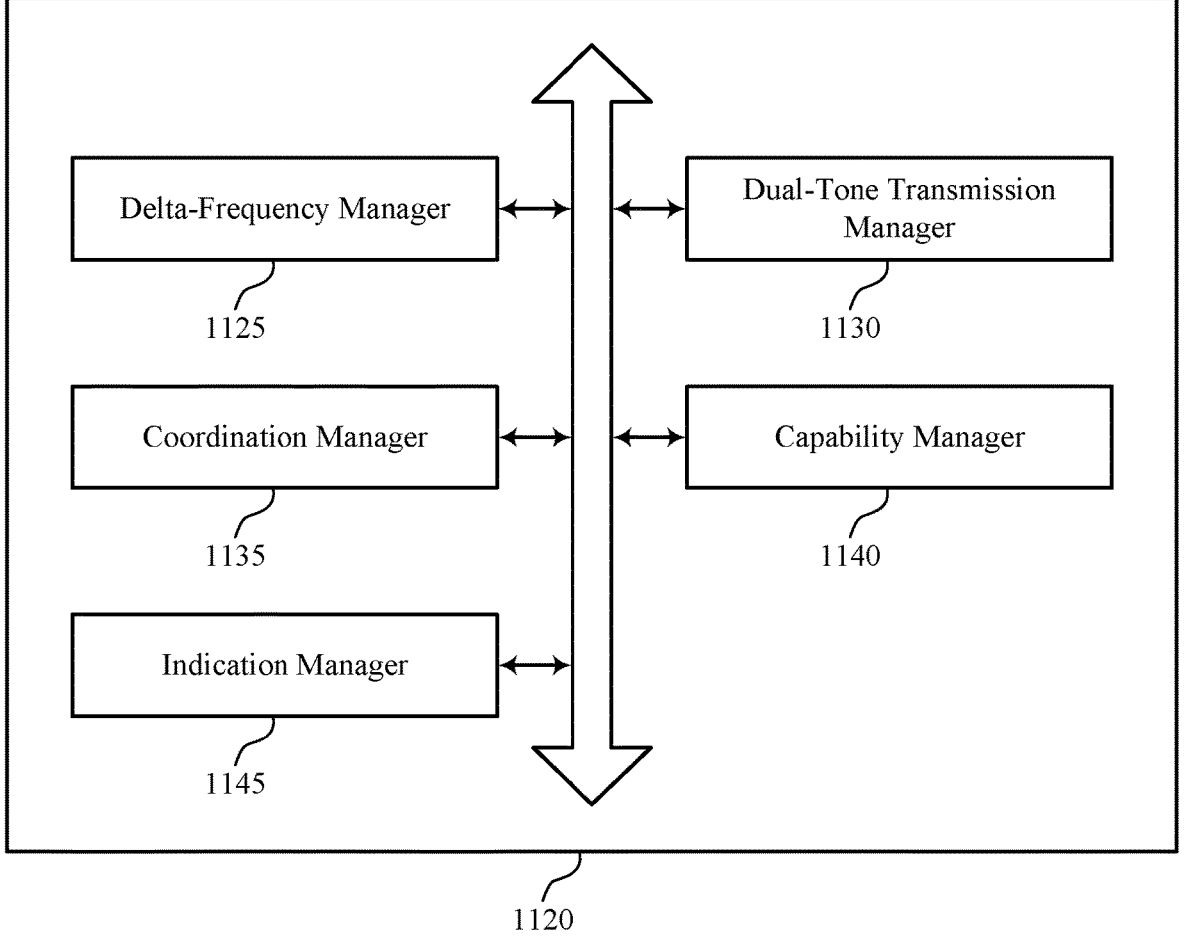
FIG. 11 shows a block diagram of a communications manager that supports envelope tracking using dual tones in accordance with one or more aspects of the present disclosure.

FIG. 11 shows a block diagram 1100 of a communications manager 1120 that supports envelope tracking using dual tones in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of envelope tracking using dual tones as described herein. For example, the communications manager 1120 may include a delta-frequency manager 1125, a dual-tone transmission manager 1130, a coordination manager 1135, a capability manager 1140, an indication manager 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The delta-frequency manager 1125 is capable of, configured to, or operable to support a means for transmitting, to a UE, an indication of a delta-frequency associated with a dual-tone downlink transmission to the UE, the delta-frequency defining a frequency difference between two tones used for the dual-tone downlink transmission. The dual-tone transmission manager 1130 is capable of, configured to, or operable to support a means for transmitting the dual-tone downlink transmission to the UE based on the delta-frequency and the two tones.

In some examples, the coordination manager 1135 is capable of, configured to, or operable to support a means for coordinating with a neighboring network entity to determine the two tones, the delta-frequency, or both.

In some examples, the capability manager 1140 is capable of, configured to, or operable to support a means for receiving a capability message indicating a set of delta-frequency values supported by the UE, where the delta-frequency is based on the capability message.

In some examples, the indication manager 1145 is capable of, configured to, or operable to support a means for transmitting the indication of the delta-frequency via at least one of a SI message, a MIB message, a SIB message, or a combination thereof.

In some examples, the delta-frequency defines the frequency difference based on a threshold number of resource blocks. In some examples, the delta-frequency is based on a bandwidth of data conveyed in the dual-tone downlink transmission. In some examples, the delta-frequency is based on a modulation scheme used to convey data in the dual-tone downlink transmission. In some examples, the modulation scheme includes an amplitude shift keying-based modulation scheme or a phase shift keying-based modulation scheme.

Figure 12:
FIG. 12 shows a diagram of a system including a device that supports envelope tracking using dual tones in accordance with one or more aspects of the present disclosure.

FIG. 12 shows a diagram of a system 1200 including a device 1205 that supports envelope tracking using dual tones in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently).

The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof.

In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting envelope tracking using dual tones). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for transmitting, to a UE, an indication of a delta-frequency associated with a dual-tone downlink transmission to the UE, the delta-frequency defining a frequency difference between two tones used for the dual-tone downlink transmission. The communications manager 1220 is capable of, configured to, or operable to support a means for transmitting the dual-tone downlink transmission to the UE based on the delta-frequency and the two tones.

By including or configuring the communications manager 1220 in accordance with examples as described herein, the device 1205 may support techniques for dual-tone downlink transmissions from a network entity based on a delta-frequency between the two tones.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of envelope tracking using dual tones as described herein, or the processor 1235 and the memory 1225 may be otherwise configured to perform or support such operations.

FIG. 13 shows a flowchart illustrating a method 1300 that supports envelope tracking using dual tones in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1305, the method may include receiving an indication of a delta-frequency associated with a dual-tone downlink transmission from a network entity, the delta-frequency defining a frequency difference between two tones used for the dual-tone downlink transmission. The operations of 1305 may be performed in accordance with examples as disclosed herein. In some examples, aspects of the operations of 1305 may be performed by a delta-frequency manager 725 as described with reference to FIG. 7.

At 1310, the method may include receiving the dual-tone downlink transmission from the network entity according to the two tones. The operations of 1310 may be performed in accordance with examples as disclosed herein. In some examples, aspects of the operations of 1310 may be performed by a dual-tone transmission manager 730 as described with reference to FIG. 7.

At 1315, the method may include decoding the dual-tone downlink transmission based on the delta-frequency. The operations of 1315 may be performed in accordance with examples as disclosed herein. In some examples, aspects of the operations of 1315 may be performed by a decoding manager 735 as described with reference to FIG. 7.

FIG. 14 shows a flowchart illustrating a method 1400 that supports envelope tracking using dual tones in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1405, the method may include transmitting a capability message indicating a set of delta-frequency values supported by the UE, where the delta-frequency is based on the capability message. The operations of 1405 may be performed in accordance with examples as disclosed herein. In some examples, aspects of the operations of 1405 may be performed by a capability manager 745 as described with reference to FIG. 7.

At 1410, the method may include receiving an indication of a delta-frequency associated with a dual-tone downlink transmission from a network entity, the delta-frequency defining a frequency difference between two tones used for the dual-tone downlink transmission. The operations of 1410 may be performed in accordance with examples as disclosed herein. In some examples, aspects of the operations of 1410 may be performed by a delta-frequency manager 725 as described with reference to FIG. 7.

At 1415, the method may include receiving the dual-tone downlink transmission from the network entity according to the two tones. The operations of 1415 may be performed in accordance with examples as disclosed herein. In some examples, aspects of the operations of 1415 may be performed by a dual-tone transmission manager 730 as described with reference to FIG. 7.

At 1420, the method may include decoding the dual-tone downlink transmission based on the delta-frequency. The operations of 1420 may be performed in accordance with examples as disclosed herein. In some examples, aspects of the operations of 1420 may be performed by a decoding manager 735 as described with reference to FIG. 7.

FIG. 15 shows a flowchart illustrating a method 1500 that supports envelope tracking using dual tones in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving an indication of a delta-frequency associated with a dual-tone downlink transmission from a network entity, the delta-frequency defining a frequency difference between two tones used for the dual-tone downlink transmission. The operations of 1505 may be performed in accordance with examples as disclosed herein. In some examples, aspects of the operations of 1505 may be performed by a delta-frequency manager 725 as described with reference to FIG. 7.

At 1510, the method may include receiving the dual-tone downlink transmission from the network entity according to the two tones. The operations of 1510 may be performed in accordance with examples as disclosed herein. In some examples, aspects of the operations of 1510 may be performed by a dual-tone transmission manager 730 as described with reference to FIG. 7.

At 1515, the method may include decoding the dual-tone downlink transmission based on the delta-frequency. The operations of 1515 may be performed in accordance with examples as disclosed herein. In some examples, aspects of the operations of 1515 may be performed by a decoding manager 735 as described with reference to FIG. 7.

At 1520, the method may include applying a frequency shift according to the delta-frequency during an envelope detector operation performed on the dual-tone downlink transmission. The operations of 1520 may be performed in accordance with examples as disclosed herein. In some examples, aspects of the operations of 1520 may be performed by an envelope detector manager 750 as described with reference to FIG. 7.

Figure 16:
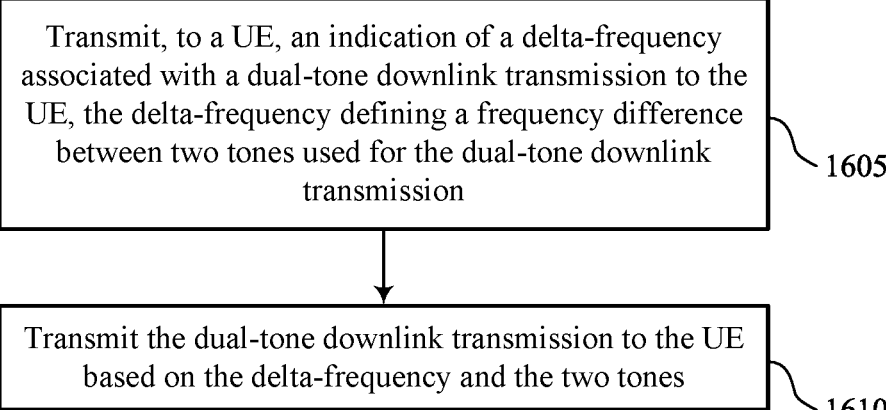

FIG. 16 shows a flowchart illustrating a method 1600 that supports envelope tracking using dual tones in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include transmitting, to a UE, an indication of a delta-frequency associated with a dual-tone downlink transmission to the UE, the delta-frequency defining a frequency difference between two tones used for the dual-tone downlink transmission. The operations of 1605 may be performed in accordance with examples as disclosed herein. In some examples, aspects of the operations of 1605 may be performed by a delta-frequency manager 1125 as described with reference to FIG. 11.

At 1610, the method may include transmitting the dual-tone downlink transmission to the UE based on the delta-frequency and the two tones. The operations of 1610 may be performed in accordance with examples as disclosed herein. In some examples, aspects of the operations of 1610 may be performed by a dual-tone transmission manager 1130 as described with reference to FIG. 11.

FIG. 17 shows a flowchart illustrating a method 1700 that supports envelope tracking using dual tones in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1705, the method may include coordinating with a neighboring network entity to determine the two tones, the delta-frequency, or both. The operations of 1705 may be performed in accordance with examples as disclosed herein. In some examples, aspects of the operations of 1705 may be performed by a coordination manager 1135 as described with reference to FIG. 11.

At 1710, the method may include transmitting, to a UE, an indication of a delta-frequency associated with a dual-tone downlink transmission to the UE, the delta-frequency defining a frequency difference between two tones used for the dual-tone downlink transmission. The operations of 1710 may be performed in accordance with examples as disclosed herein. In some examples, aspects of the operations of 1710 may be performed by a delta-frequency manager 1125 as described with reference to FIG. 11.

At 1715, the method may include transmitting the dual-tone downlink transmission to the UE based on the delta-frequency and the two tones. The operations of 1715 may be performed in accordance with examples as disclosed herein. In some examples, aspects of the operations of 1715 may be performed by a dual-tone transmission manager 1130 as described with reference to FIG. 11.

The following provides an overview of aspects of the present disclosure:

Aspect 1: A method for wireless communications at a UE, comprising: receiving an indication of a delta-frequency associated with a dual-tone downlink transmission from a network entity, the delta-frequency defining a frequency difference between two tones used for the dual-tone downlink transmission; receiving the dual-tone downlink transmission from the network entity according to the two tones; and decoding the dual-tone downlink transmission based at least in part on the delta-frequency.

Aspect 2: The method of aspect 1, further comprising: receiving the indication of the delta-frequency via at least one of a system information message, a MIB message, a SIB, or a combination thereof.

Aspect 3: The method of any of aspects 1 through 2, further comprising: transmitting a capability message indicating a set of delta-frequency values supported by the UE, wherein the delta-frequency is based at least in part on the capability message.

Aspect 4: The method of any of aspects 1 through 3, wherein decoding the dual-tone downlink transmission comprises: applying a frequency shift according to the delta-frequency during an envelope detector operation performed on the dual-tone downlink transmission.

Aspect 5: The method of any of aspects 1 through 4, wherein the delta-frequency defines the frequency difference based at least in part on a threshold number of resource blocks.

Aspect 6: The method of any of aspects 1 through 5, wherein the delta-frequency is based at least in part on a bandwidth of data conveyed in the dual-tone downlink transmission.

Aspect 7: The method of any of aspects 1 through 6, wherein the delta-frequency is based at least in part on a modulation scheme used to convey data in the dual-tone downlink transmission.

Aspect 8: The method of aspect 7, wherein the modulation scheme comprises an amplitude shift keying-based modulation scheme or a phase shift keying-based modulation scheme.

Aspect 9: A method for wireless communications at a network entity, comprising: transmitting, to a UE, an indication of a delta-frequency associated with a dual-tone downlink transmission to the UE, the delta-frequency defining a frequency difference between two tones used for the dual-tone downlink transmission; and transmitting the dual-tone downlink transmission to the UE based at least in part on the delta-frequency and the two tones.

Aspect 10: The method of aspect 9, further comprising: coordinating with a neighboring network entity to determine the two tones, the delta-frequency, or both.

Aspect 11: The method of any of aspects 9 through 10, further comprising: receiving a capability message indicating a set of delta-frequency values supported by the UE, wherein the delta-frequency is based at least in part on the capability message.

Aspect 12: The method of any of aspects 9 through 11, further comprising: transmitting the indication of the delta-frequency via at least one of a system information message, a MIB message, a SIB, or a combination thereof.

Aspect 13: The method of any of aspects 9 through 12, wherein the delta-frequency defines the frequency difference based at least in part on a threshold number of resource blocks.

Aspect 14: The method of any of aspects 9 through 13, wherein the delta-frequency is based at least in part on a bandwidth of data conveyed in the dual-tone downlink transmission.

Aspect 15: The method of any of aspects 9 through 14, wherein the delta-frequency is based at least in part on a modulation scheme used to convey data in the dual-tone downlink transmission.

Aspect 16: The method of any of aspects 9 through 15, wherein the modulation scheme comprises an amplitude shift keying-based modulation scheme or a phase shift keying-based modulation scheme.

Aspect 17: An apparatus for wireless communications at a UE, comprising a processor; memory coupled with the processor; and instructions stored in the memory and executable by the processor to cause the apparatus to perform a method of any of aspects 1 through 8.

Aspect 18: An apparatus for wireless communications at a UE, comprising at least one means for performing a method of any of aspects 1 through 8.

Aspect 19: A non-transitory computer-readable medium storing code for wireless communications at a UE, the code comprising instructions executable by a processor to perform a method of any of aspects 1 through 8.

Aspect 20: An apparatus for wireless communications at a network entity, comprising a processor; memory coupled with the processor; and instructions stored in the memory and executable by the processor to cause the apparatus to perform a method of any of aspects 9 through 16.

Aspect 21: An apparatus for wireless communications at a network entity, comprising at least one means for performing a method of any of aspects 9 through 16.

Aspect 22: A non-transitory computer-readable medium storing code for wireless communications at a network entity, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

a processor; and memory coupled with the processor, the memory comprising instructions executable by the processor to cause the apparatus to:

receive an indication of a delta-frequency associated with a dual-tone downlink transmission from a network entity, the delta-frequency defining a frequency difference between two tones used for the dual-tone downlink transmission, wherein the dual-tone downlink transmission comprises a data waveform that is transmitted at two frequencies, the two frequencies corresponding to the two tones;

receive the dual-tone downlink transmission from the network entity according to the two tones; and decode the dual-tone downlink transmission based at least in part on the delta-frequency.

2. The apparatus of claim 1, wherein the instructions are further executable by the processor to cause the apparatus to:

receive the indication of the delta-frequency via at least one of a system information message, a master information block message, a system information block, or a combination thereof.

3. The apparatus of claim 1, wherein the instructions are further executable by the processor to cause the apparatus to:

transmit a capability message indicating a set of delta-frequency values supported by the UE, wherein the delta-frequency is based at least in part on the capability message.

4. The apparatus of claim 1, wherein the instructions to decode the dual-tone downlink transmission are executable by the processor to cause the apparatus to:

apply a frequency shift according to the delta-frequency during an envelope detector operation performed on the dual-tone downlink transmission.

5. The apparatus of claim 1, wherein the delta-frequency defines the frequency difference based at least in part on a threshold number of resource blocks.

6. The apparatus of claim 1, wherein the delta-frequency is based at least in part on a bandwidth of data conveyed in the dual-tone downlink transmission.

7. The apparatus of claim 1, wherein the delta-frequency is based at least in part on a modulation scheme used to convey data in the dual-tone downlink transmission.

8. The apparatus of claim 7, wherein the modulation scheme comprises an amplitude shift keying-based modulation scheme or a phase shift keying-based modulation scheme.

9. An apparatus for wireless communications at a network entity, comprising:

a processor; and memory coupled with the processor, the memory comprising instructions executable by the processor to cause the apparatus to:

transmit, to a user equipment (UE), an indication of a delta-frequency associated with a dual-tone downlink transmission to the UE, the delta-frequency defining a frequency difference between two tones used for the dual-tone downlink transmission, wherein the dual-tone downlink transmission comprises a data waveform that is transmitted at two frequencies, the two frequencies corresponding to the two tones; and transmit the dual-tone downlink transmission to the UE based at least in part on the delta-frequency and the two tones.

10. The apparatus of claim 9, wherein the instructions are further executable by the processor to cause the apparatus to:

coordinate with a neighboring network entity to determine the two tones, the delta-frequency, or both.

11. The apparatus of claim 9, wherein the instructions are further executable by the processor to cause the apparatus to:

receive a capability message indicating a set of delta-frequency values supported by the UE, wherein the delta-frequency is based at least in part on the capability message.

12. The apparatus of claim 9, wherein the instructions are further executable by the processor to cause the apparatus to:

transmit the indication of the delta-frequency via at least one of a system information message, a master information block message, a system information block, or a combination thereof.

13. The apparatus of claim 9, wherein the delta-frequency defines the frequency difference based at least in part on a threshold number of resource blocks.

14. The apparatus of claim 9, wherein the delta-frequency is based at least in part on a bandwidth of data conveyed in the dual-tone downlink transmission.

15. The apparatus of claim 9, wherein the delta-frequency is based at least in part on a modulation scheme used to convey data in the dual-tone downlink transmission.

16. The apparatus of claim 9, wherein a modulation scheme associated with the dual-tone downlink transmission comprises an amplitude shift keying-based modulation scheme or a phase shift keying-based modulation scheme.

17. A method for wireless communications at a user equipment (UE), comprising:

receiving an indication of a delta-frequency associated with a dual-tone downlink transmission from a network entity, the delta-frequency defining a frequency difference between two tones used for the dual-tone downlink transmission, wherein the dual-tone downlink transmission comprises a data waveform that is transmitted at two frequencies, the two frequencies corresponding to the two tones;

receiving the dual-tone downlink transmission from the network entity according to the two tones; and decoding the dual-tone downlink transmission based at least in part on the delta-frequency.

18. The method of claim 17, further comprising:

receiving the indication of the delta-frequency via at least one of a system information message, a master information block message, a system information block, or a combination thereof.

19. The method of claim 17, further comprising:

transmitting a capability message indicating a set of delta-frequency values supported by the UE, wherein the delta-frequency is based at least in part on the capability message.

20. The method of claim 17, wherein decoding the dual-tone downlink transmission comprises:

applying a frequency shift according to the delta-frequency during an envelope detector operation performed on the dual-tone downlink transmission.

21. The method of claim 17, wherein the delta-frequency defines the frequency difference based at least in part on a threshold number of resource blocks.

22. The method of claim 17, wherein the delta-frequency is based at least in part on a bandwidth of data conveyed in the dual-tone downlink transmission.

23. The method of claim 17, wherein the delta-frequency is based at least in part on a modulation scheme used to convey data in the dual-tone downlink transmission.

24. The method of claim 23, wherein the modulation scheme comprises an amplitude shift keying-based modulation scheme or a phase shift keying-based modulation scheme.

25. A method for wireless communications at a network entity, comprising:

transmitting, to a user equipment (UE), an indication of a delta-frequency associated with a dual-tone downlink transmission to the UE, the delta-frequency defining a frequency difference between two tones used for the dual-tone downlink transmission, wherein the dual-tone downlink transmission comprises a data waveform that is transmitted at two frequencies, the two frequencies corresponding to the two tones; and transmitting the dual-tone downlink transmission to the UE based at least in part on the delta-frequency and the two tones.

26. The method of claim 25, further comprising:
coordinating with a neighboring network entity to determine the two tones, the delta-frequency, or both.

27. The method of claim 25, further comprising:
receiving a capability message indicating a set of delta-frequency values supported by the UE, wherein the delta-frequency is based at least in part on the capability message.

28. The method of claim 25, further comprising:
transmitting the indication of the delta-frequency via at least one of a system information message, a master information block message, a system information block, or a combination thereof.

29. The method of claim 25, wherein the delta-frequency defines the frequency difference based at least in part on a threshold number of resource blocks.

30. The method of claim 25, wherein the delta-frequency is based at least in part on a bandwidth of data conveyed in the dual-tone downlink transmission.

\* \* \* \* \*